Sept. 7, 1948.                    C. C. FUERST                    2,448,876
                      HIGH SPEED SYMMETRICAL OPENING
                           PHOTOGRAPHIC SHUTTER
Filed May 21, 1945                                          8 Sheets-Sheet 1

CARL C. FUERST
*INVENTOR*

BY

*ATTORNEYS*

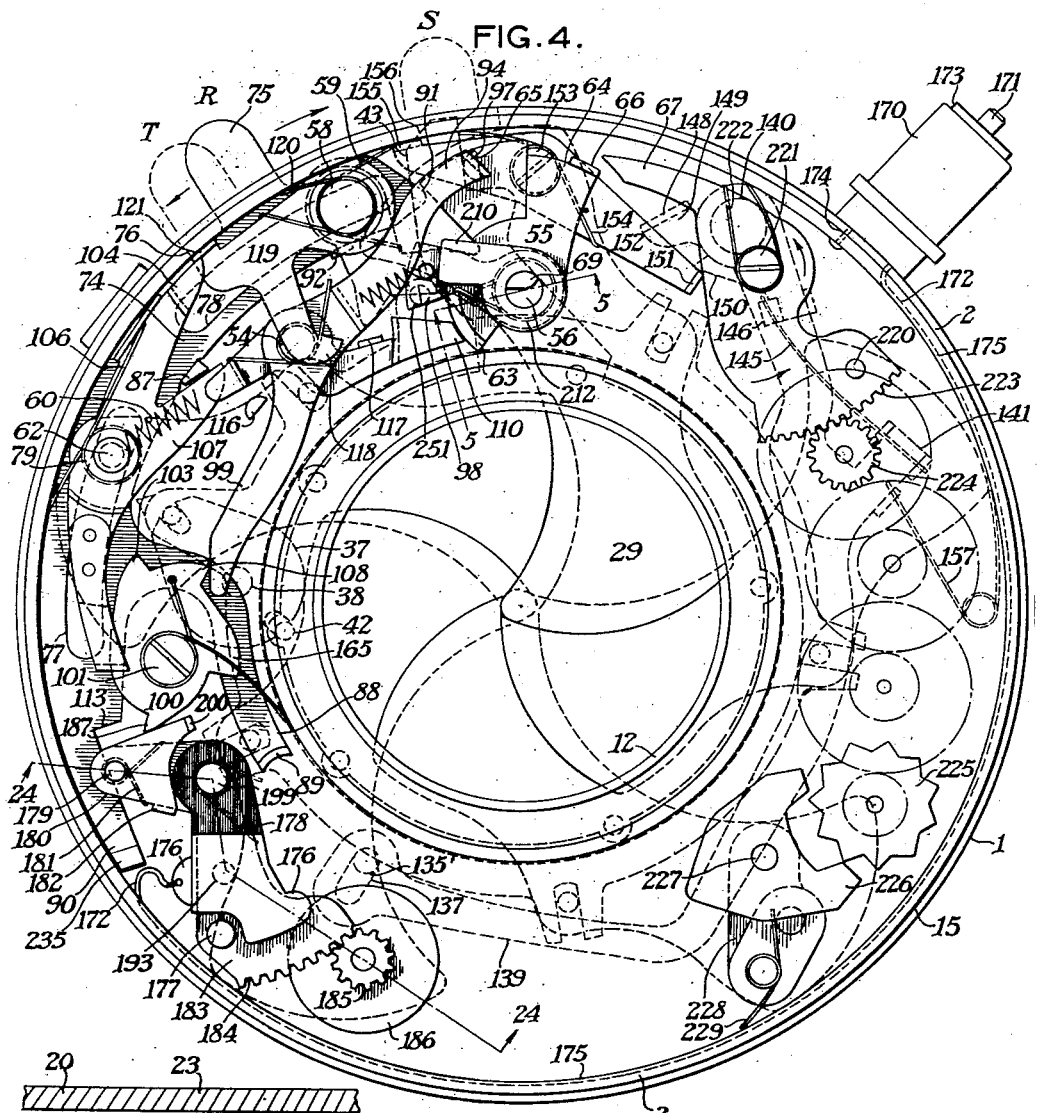

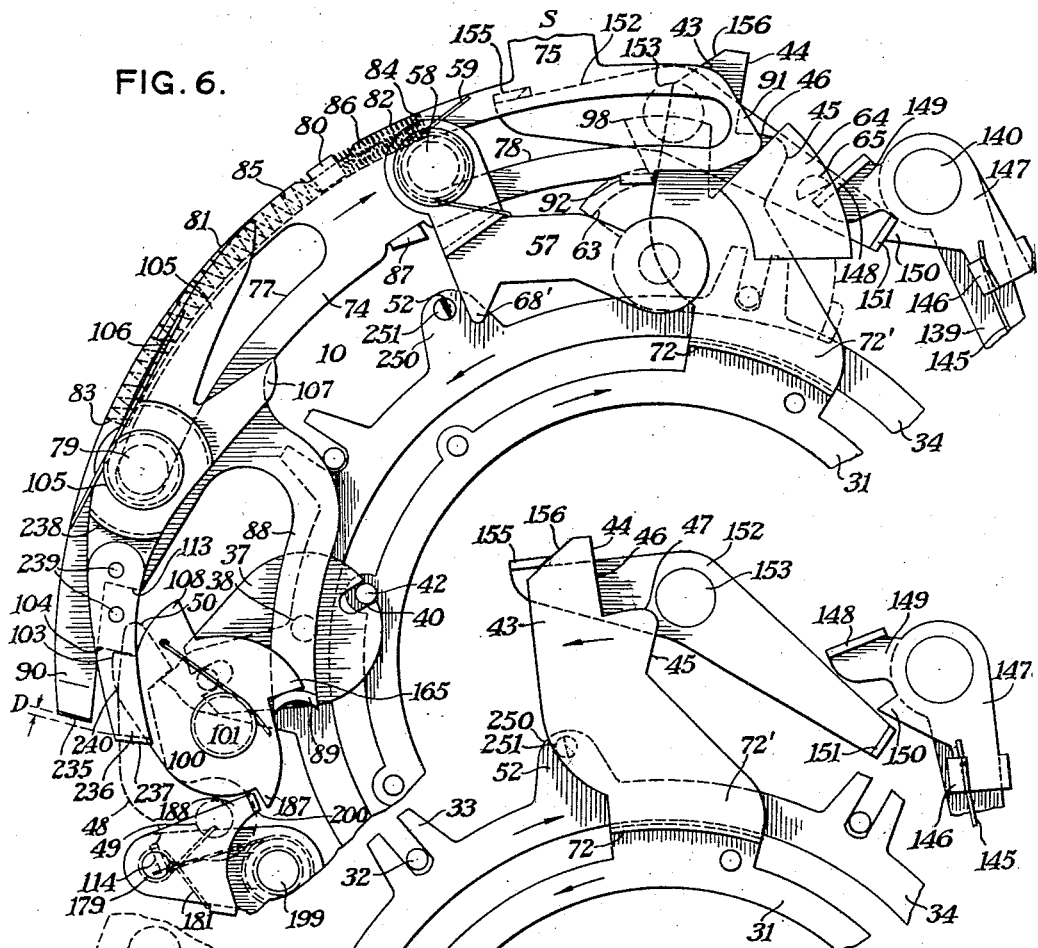

Sept. 7, 1948.  C. C. FUERST  2,448,876
HIGH SPEED SYMMETRICAL OPENING
PHOTOGRAPHIC SHUTTER
Filed May 21, 1945  8 Sheets-Sheet 4
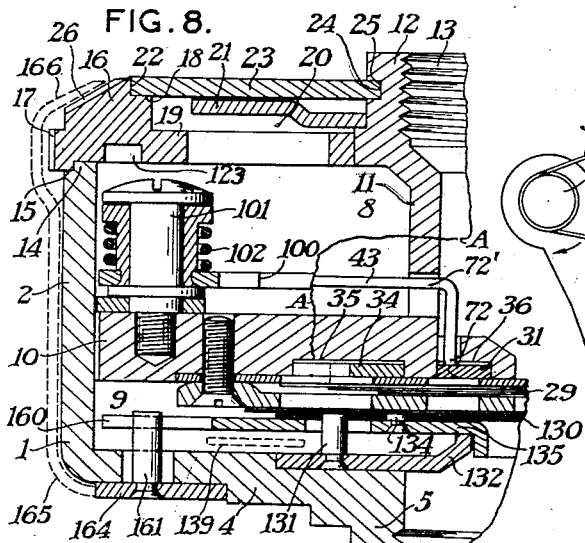
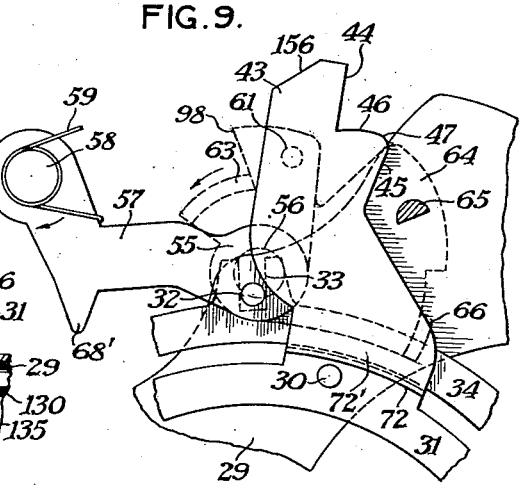
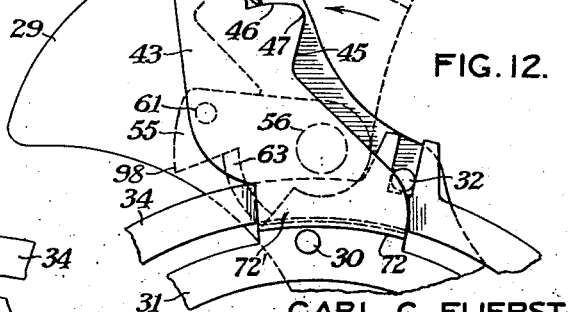
CARL C. FUERST
INVENTOR
BY
ATTORNEYS Sept. 7, 1948.  C. C. FUERST  2,448,876
HIGH SPEED SYMMETRICAL OPENING
PHOTOGRAPHIC SHUTTER
Filed May 21, 1945  8 Sheets-Sheet 5
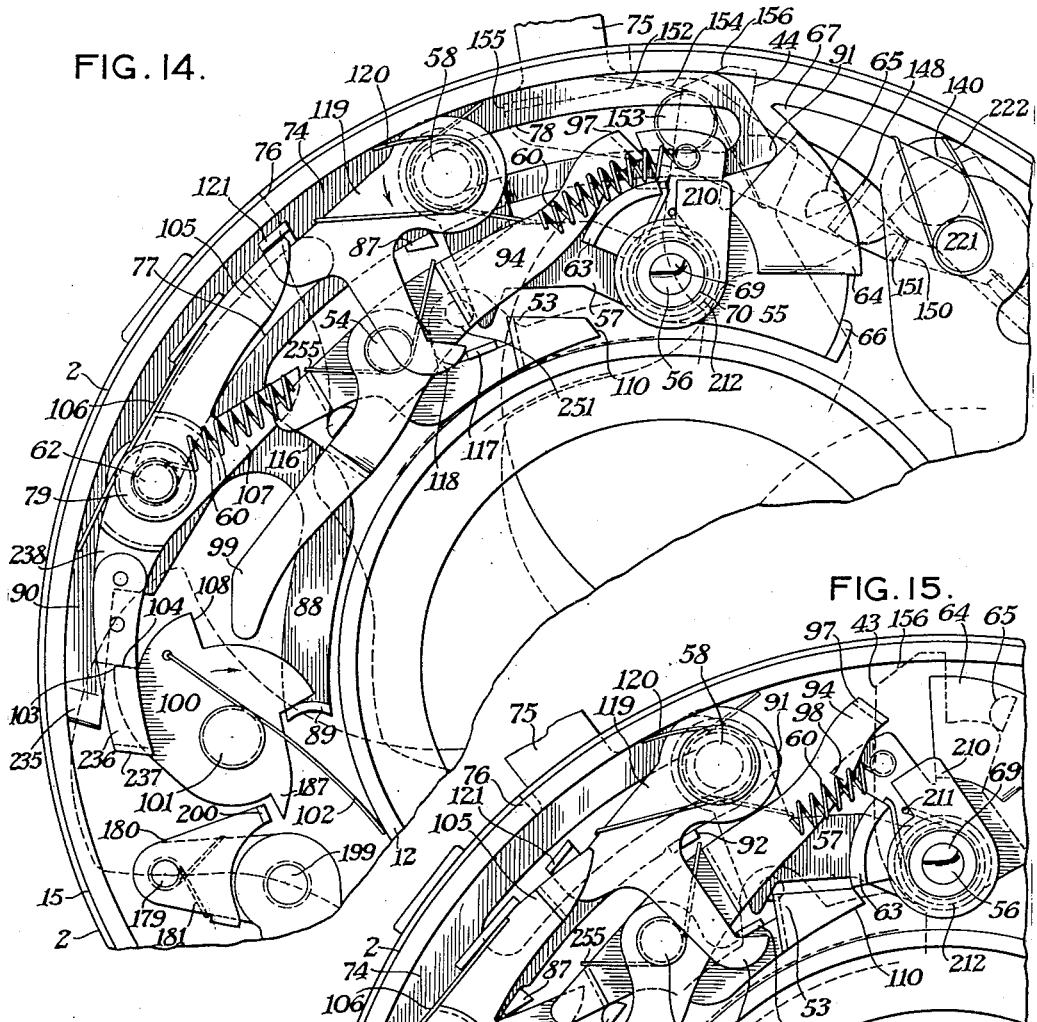
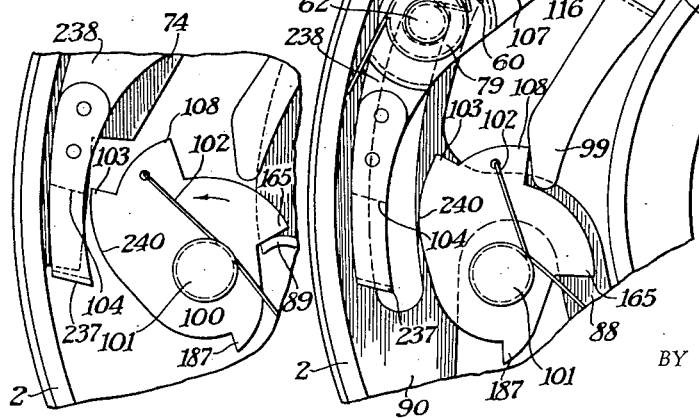
CARL C. FUERST
INVENTOR
ATTORNEYS

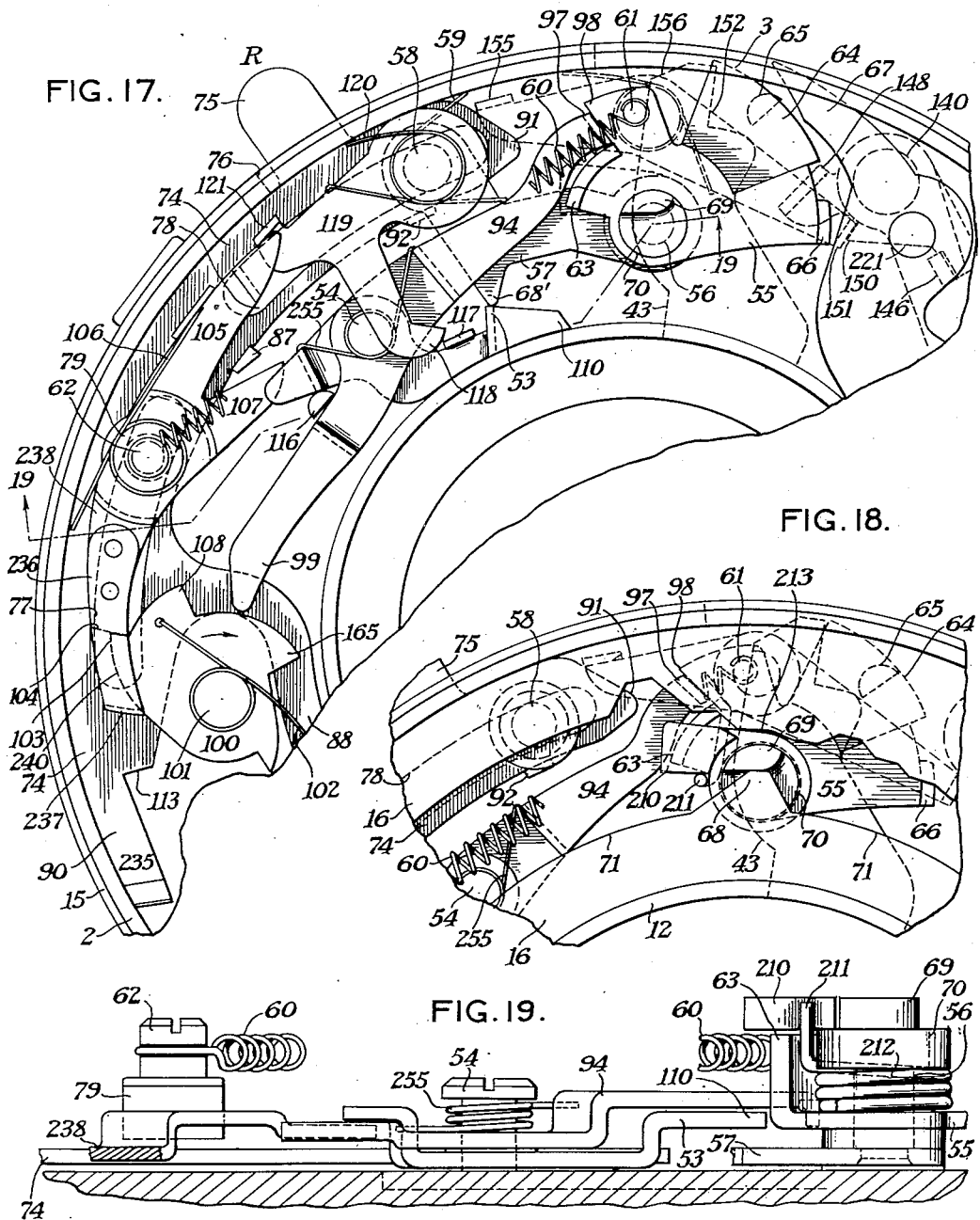

Sept. 7, 1948.
C. C. FUERST
HIGH SPEED SYMMETRICAL OPENING
PHOTOGRAPHIC SHUTTER
2,448,876

Filed May 21, 1945
8 Sheets-Sheet 7

CARL C. FUERST
INVENTOR

BY
ATTORNEYS

Sept. 7, 1948.    C. C. FUERST    2,448,876
HIGH SPEED SYMMETRICAL OPENING
PHOTOGRAPHIC SHUTTER
Filed May 21, 1945    8 Sheets-Sheet 8

CARL C. FUERST
INVENTOR
BY
ATTORNEYS

Patented Sept. 7, 1948

2,448,876

UNITED STATES PATENT OFFICE 2,448,876

HIGH-SPEED SYMMETRICAL OPENING PHOTOGRAPHIC SHUTTER

Carl C. Fuerst, Rochester, N. Y., assignor to Eastman Kodak Company, Rochester, N. Y., a corporation of New Jersey Application May 21, 1945, Serial No. 595,033

49 Claims. (Cl. 95—63)

This invention relates to photography and particularly to an improved form of between-the-lens shutter. One object of my invention is to provide a shutter mechanism which is capable of obtaining extremely short exposures. Another object of my invention is to provide a shutter of the so-called setting type with a single operating lever which serves both to set the shutter for an exposure when moved in one direction and for a trigger for releasing the shutter mechanism when said operating member is moved in a reverse direction. Another object of my invention is to provide a shutter with a setting and releasing mechanism so arranged that the setting mechanism does not impede the operation of the shutter during an exposure. Another object of my invention is to provide a shutter with a shutter releasing mechanism so arranged that the actual release of the shutter mechanism is accomplished automatically after the manual operation of the releasing lever. A still further object of my invention is to provide a shutter with a power driven releasing mechanism and a manual control therefor arranged so that extremely light pressure on the control member will release the power-operated member which in turn releases the shutter mechanism. A still further object of my invention is to provide a power-operated releasing mechanism and to provide a means for controlling its time of operation. A further object of my invention is to provide a means for accurately predetermining the synchronism of a flash lamp with the operation of the shutter leaves and for varying this timing to suit the characteristics of different flash lamps. A still further object of my invention is to provide an improved shutter mechanism in which the inertia of the operating parts is reduced to a minimum and in which the actual moving parts for making an exposure are also reduced to a minimum whereby high-speed exposures may be obtained. A still further object of my invention is to provide a means for varying the effect of the master member and for altering the driving relationship between the master member and the shutter blade operating ring. Other objects will appear from the following specification, the novel features being particularly pointed out in the claims at the end thereof.

This application is a continuation-in-part of my copending application Serial No. 549,529, Photographic shutter, filed August 15, 1944, now abandoned.

In the drawings wherein like reference characters denote like parts throughout:

Fig. 4 is an enlarged front elevation of the shutter shown in Fig. 1, but with the shutter cover and adjusting cams removed to expose the mechanism;

Fig. 5 is a fragmentary detail section through the master member and associated parts taken on line 5—5 of Fig. 4;

Fig. 6 is a fragmentary detail front elevation of parts of the shutter actuating mechanism, parts being omitted for clearness;

Fig. 7 is a fragmentary detail front elevation of certain shutter parts including the blade operating rings and certain controls therefor;

Fig. 8 is an enlarged schematic fragmentary sectional view through a portion of the shutter shown in Fig. 1, a portion of this view (shown by section line A—A) being taken through a portion of the blade ring arm to show the relation of these parts in the shutter casing chambers;

Fig. 9 is an enlarged fragmentary front plan view of a portion of the blade rings and master member, the parts being shown in a set position and for exposures of "normal" automatic speeds;

Fig. 10 is a view similar to Fig. 9 but with the parts positioned for a "high" speed exposure. The parts are in a set position;

Fig. 11 is a view substantially similar to Figs. 8 and 9 but with the parts in position to open the blades as the master member moves from one contact surface to another;

Fig. 12 is a view similar to the views of Figs. 9 to 11, inclusive, but with the parts in their "exposed" or fully closed position;

Fig. 13 is a fragmentary detail showing the blade ring latch in an operative position;

Fig. 14 is an enlarged fragmentary front view showing the shutter setting and releasing mechanism, the parts being shown in a fully set position for an exposure of $\frac{1}{25}$ of a second;

Fig. 15 is a view similar to Fig. 14 but with the parts shown released for a "bulb" exposure, the blades being fully open;

Fig. 16 is a fragmentary detail plan of the operating handle latch;

Fig. 17 is a view similar to Figs. 14 and 15, but with the parts set for extreme high speed;

Fig. 18 is a detail plan view showing portions of the high speed mechanism with auxiliary spring tensioned;

Fig. 19 is a section taken on line 19—19 of Fig. 17;

Figure 1:
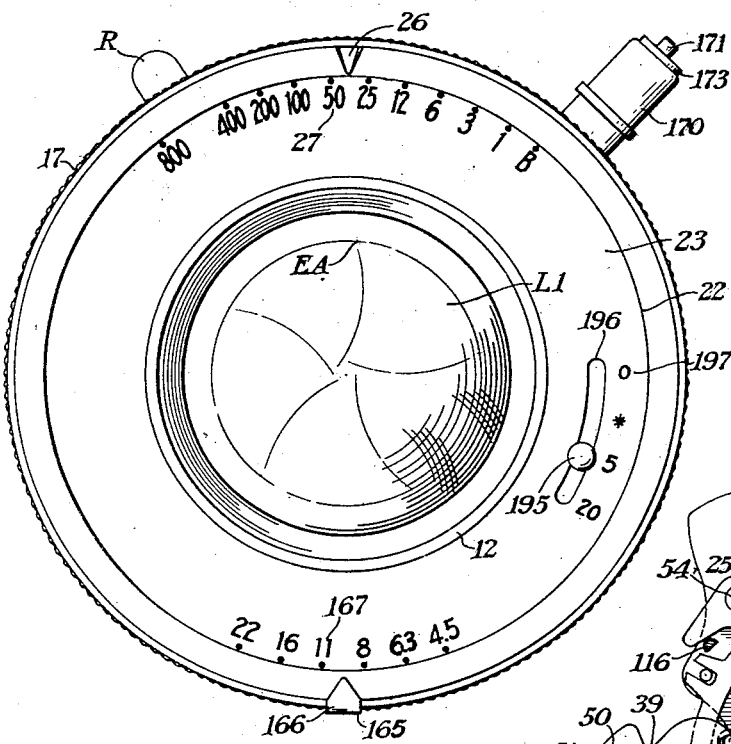
Fig. 1 is a front elevation of a typical shutter constructed in accordance with, and embodying, a preferred form of my invention.

My invention comprises broadly a shutter having blades of a symmetrical type movable in one direction only for opening and closing to make an exposure. In setting, the blades are likewise moved but in a reverse direction. Consequently I use diaphragm leaves which automatically cover the exposure aperture while the blades open and close during the setting movement. It further comprises mechanisms for operating the blades and diaphragm mechanism in synchronized relationship and for producing a shutter having a wide range of exposures of automatic duration in time as well as mechanism for producing a manually controlled exposure.

In the preferred form of my invention shown in the drawings, the shutter may include the usual type of casing 1 having a central aperture EA through which light passes in making an exposure. The casing is provided with an upstanding annular flange 2 and this flange is provided with a series of milled-out clearance portions 3, these portions being provided to permit certain parts to move through their full path of movement. As indicated in Figure 8, the bottom wall of the shutter 4 is annular in shape and it includes the usual rearwardly-extending tubular portion 5 normally threaded on the outside at 6 for attachment to a support, and threaded on the inside at 7 to receive the usual lens mount. The shutter casing is divided roughly into two chambers 8 and 9 by means of a mechanism plate 10. This mechanism plate consists of a ring-shaped member having an upstanding flange 11 of a generally cylindrical form and a forwardly-extending tubular member 12 internally threaded at 13 to support the front lens L1. The mechanism plate is secured in place by means of posts carried by the bottom of the shutter 4 and by means of screws passing through the mechanism plate 10 and into these posts. As this construction is customary, the posts and screws are not shown in the drawings.

The upstanding flange 2 of the shutter casing is preferably provided with a rim 14 which may be rabbeted at 15 if desired so as to receive a time-control cam 16 which is in the form of an annular ring and which is provided with a knurled edge 17 for turning the ring, a rabbet 18 and a flange 19, providing a space 20 in which a flash cam ring 21 may turn. The rabbet 18 receives an edge 22 of an etched plate 23 which also is provided with ears 24 forming a part of a bayonet type latch, the slots or notches 25 in the tubular member 12 forming the other part of the bayonet latch. This etched plate, when placed on the front of the shutter, remains in a fixed position, although the time-control cam supported on its outer periphery, may turn freely a distance necessary to bring a pointer 26 carried by the time-control cam opposite any one of the shutter speed graduations 27 carried by the etched plate 23.

Generally speaking, the shutter mechanism is contained in the chamber 8 above the mechanism plate 10 and the shutter blades 29 and the diaphragm leaves 130 are carried in the chamber 9 beneath the mechanism plate.

Figure 2:
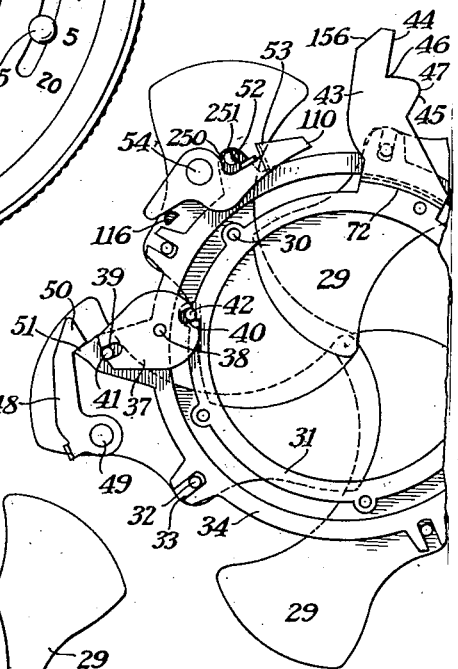
Fig. 2 is a front elevation of a preferred form of shutter blades and shutter blade operating rings used in the shutter of Fig. 1. This view shows only certain parts in a set position ready for an exposure.
Figure 3:
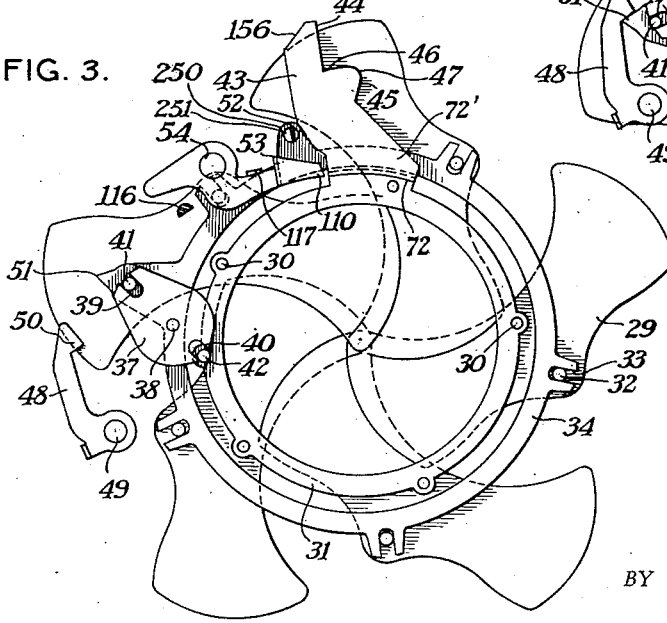
Fig. 3 is a view similar to Fig. 2 but with the parts moved to their released position which they assume after an exposure has been made.

The shutter blades 29 are of the symmetrically-shaped type which move only in one direction for opening and closing the exposure aperture 2. Each shutter blade, Figs. 2 and 3, 29 may be pivotally attached at 30 to a blade ring 31 and each shutter blade 29 may include a pin 32 extending into a slot 33 in a second blade ring 34. Each blade ring 31 and 34 is, as shown in Fig. 8, mounted to move in an arcuate slot, blade ring 34 in a slot 35 and blade ring 31 in a slot 36 formed in the underside of the mechanism plate 10. Each of these blade rings may therefore slide in their annular slot, and motion from one blade ring is transmitted to the opposite blade ring by means of a double-ended lever 37 as shown in Figs. 2 and 3. Lever 37 is carried on a pivot 38 and may freely turn thereon and includes a pair of oppositely disposed slots 39 and 40, the slot 39 engaging a pin 41 carried by blade ring 34 and the slot 40 engaging a pin 42 carried by the blade ring 31. Thus, movement of ring 34 is simultaneously transmitted to blade ring 31 and as these blade rings move in opposite directions, the blades are moved in one direction through their path of movement, thus opening and closing the shutter aperture EA.

The blade ring 31 in this instance is the driven member and for this purpose the blade ring includes an upstanding arm 43 which has two radially and annularly offset contact surfaces 44 and 45. These surfaces include a connecting surface 46 which is rounded into the contact surface 45 by the curved wall 47.

There is a blade ring latch 48 pivoted on a stud 49 and having a latching element 50 lying in the path of movement of a latching element 51 carried by the blade ring 34. The latched position is shown in Fig. 2 and the unlatched position is shown in Fig. 3. The blade rings are latched when the shutter is set and before an exposure is to be made.

The blade ring 34 as best shown in Fig. 13 carries an ear 250 supporting an upstanding holding pin 251 which may be made of a round rod milled in half to provide a shoulder 52. This pin moves in the direction shown by the arrow on the blade ring 34 in Fig. 13 when an exposure is to be made and the pin 251 may be engaged and held by the latch 53 when the blades 29 are moved to an open position. Latch 53 is pivotally mounted on a stud 54 carried by the mechanism plate and may be moved by a spring 255 (Fig. 15) in a counter-clockwise direction about the pivot 54. This latch 53 and shoulder 52 are for temporarily holding the shutter with the shutter blades 29 in their wide-open position for exposures of less than the highest speed. This will be more fully described later.

The driving mechanism or master member construction is best shown in Figs. 9 to 12 inclusive. The master member 55 is pivoted on a stud 56, this stud being carried by a lever 57 pivoted to the mechanism plate on a pivot 58. A spring 59 tends to turn this lever in the direction shown by the arrow in Fig. 9. As indicated in Fig. 14, a power spring 60 is attached to a pin 61 carried by the master member and to a stud 62 carried by the shutter casing. This spring always tends to turn the master member in the direction shown by the arrow in Fig. 9. The master member includes an upstanding flange 63 about which the spring 60 may be partially wrapped when the master member is in a position of tension or when it is set as shown in Fig. 9.

The master member 55 includes a flange 64 which carries a striking surface 65 which, in this instance, is shown as being a half-round pin. It likewise includes an upstanding flange 66, the function of which is to operate a shutter retard arm 67 as shown in Fig. 14. The master member 55 in Fig. 9 is shown in its set position from which position it operates to make exposures from one second to 1/400 of a second to 1 second according to the setting. The arm 57 may be moved by means of a cam 68 to position the master member 55 for high-speed exposures of 1/800 of a second. Thus, the master member is swung bodily on the pivoted lever 57 between the "high speed" and the "normal speed" positions when the time-control cam 16 is moved.

Figure 22:
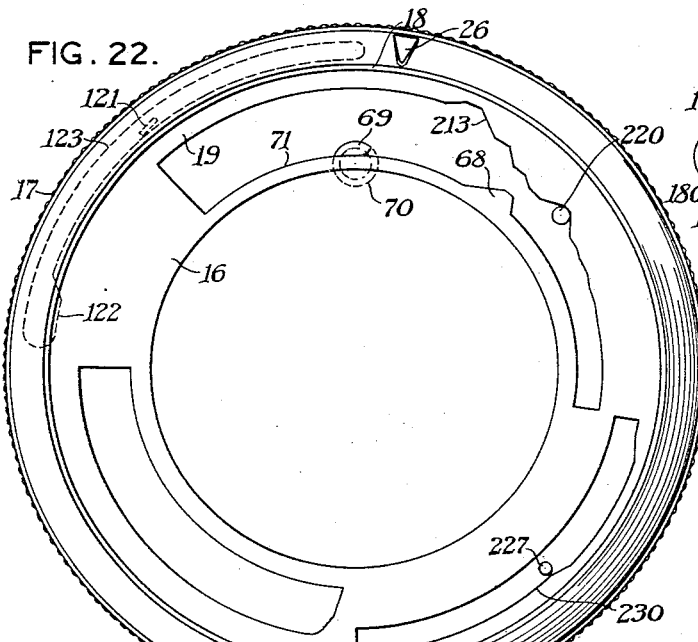
Fig. 22 shows the speed adjusting cam removed from the shutter, the cam followers being shown in position.
Figure 23:
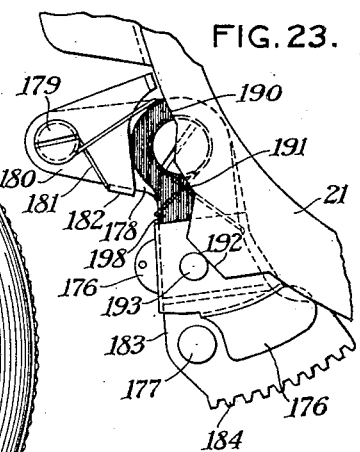
Fig. 23 is a fragmentary detail showing the synchronizing gear train positioned for a 20 millisecond delay.
Figure 24:
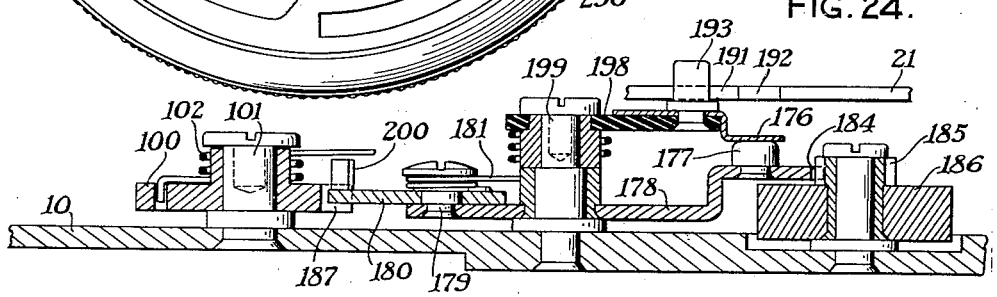
Fig. 24 is an enlarged fragmentary section through the oscillatable disk and associated retard and taken on line 24—24 of Fig. 4.
Figure 26:
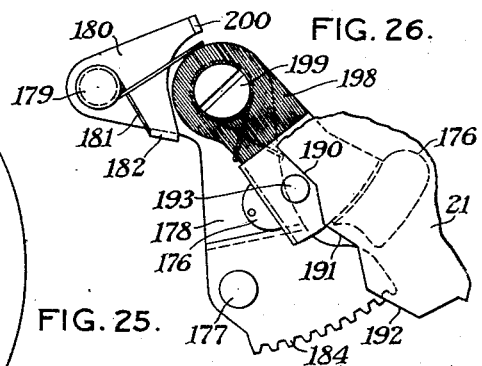
Fig. 26 is fragmentary detail of synchronizing switch removed from shutter.

The time-control cam 16 as shown in Fig. 22 consists of a ring movably mounted on the shutter casing as above described, this ring including a cam lug 68 which is the high-speed lug in that when the cam ring is moved until the pointer 26 is opposite the graduation 800 as indicated in Fig. 1, the cam follower 69, shown in Figs. 5 and 22, is moved radially outwardly by the cam 68, thereby swinging the lever 57 in a substantially radial direction against the action of its spring 59 and positioning the master member in the high-speed position of Fig. 10. The cam follower 69 is preferably made by milling off a portion of the head 70 of the stud 56 on which the master member 55 is mounted to swing. However, this is just a convenience in manufacture. From the cam shown in Fig. 22 it will be noticed that in the present embodiment of my invention the cam follower 69 is only moved when the lug 68 engages it and this only occurs when the highest speed 1/800 is to be used. In all other positions the cam follower is moved down against the concentric cam surface 71 in which the lever 57 is held in its "normal" speed position. That is, the position in which it will lie for all shutter speeds other than 1/800 and including "bulb."

It will be noticed from Fig. 5 that the master member 55 lies above the mechanism plate 10 and from Fig. 8 that the blade ring 31 which carries the driving arm 43 lies beneath the mechanism plate. From the small section A—A in Fig. 8 it will be noticed that this is accomplished by bending the arm 43 sharply upwardly at 72 and outwardly at 72' so that the radially-extending arm 43 may lie substantially in the plane of the master member 55 and in a position to be struck by the striking surface 65.

In order to set and release the shutter, I preferably provide a manually-operable lever 74 as shown in Fig. 6. This lever has a handle 75 which projects through a slot 76 in the upstanding flange 2 of the shutter casing (Fig. 14). Referring to Fig. 6, the manually-operable lever is an arcuate plate having arcuate slots 77 and 78 which slide about studs 79 and 58. Stud 58 also supports the master member carrying pivoted lever 57. The arcuate plate 74 carries a lug 80 which engages one end of a spring 81 and one end of a second spring 82, the opposite end of spring 81 engaging an abutment 83 and the opposite end of spring 82 engaging an abutment 84. Spring 81 lies in a groove 85 in the mechanism plate 10 and spring 82 lies in a similar groove 86, the purpose of these two springs being to normally hold the manually-operated lever 74 in a normal position of rest indicated by "R" in Fig. 4. This figure also shows the set position "S" of the lever 75 and the tripped position "T" since the single lever 74 is used to both set and trip the shutter, and serves both for a shutter setting lever and a trigger.

Referring again to Fig. 6, the lever 74 includes a releasing lug 87 formed upwardly from the lever and includes an offset arm 88 having an upturned flange 89. Lever 74 has an extended arm 90, the purpose of which will be later described. On the opposite end of the lever 74 there is a nose 91 which is positioned to engage and move the master member 55 through engagement with part 64 thereof, so as to swing the master member to its set position as shown in Fig. 6. At the same time an upwardly-extending lug 92 carried by the lever 74 may engage and turn the blade ring arm 43 so that it too will be moved to the set position shown in Fig. 6.

When the master member 43 is moved to its set position (Figs. 17 and 18) it may be held in this position by means of a master member latch element 94 pivoted on a stud 54 and pressed by a spring 255 in a clockwise direction so that the end 97 of this lever, which is a formed-down lug, may engage the flange 98 to retain the master member in its set position. When set for "high" speed the master member 43 travels substantially the same distance as for "normal" speeds but returns some distance before it is latched due to the position of the master member pivot 56 which has to be moved by arm 57. This difference in set position for "high" and "normal" speeds can readily be eliminated if a larger shutter casing is used. The latch member 94 at the opposite end is provided with an arm 99 which lies adjacent an oscillatable disk 100, this disk being freely movable about a stud 101 and including the spring 102 tending to drive this disk in a clockwise direction. When this disk has been set, which is the position shown in Fig. 17, a tooth 103 engages the end 104 of a tripping latch pivoted on stud 79 and normally turned by a spring 106 in a counter-clockwise direction. An arm 107 of this lever extends into the path of the upstanding lug 87 of the manually-operable lever 74 and, consequently, when the handle 75 is moved from the rest position shown in Fig. 17 to the tripped position of Fig. 4, the lug 87 engages the arm 107, releasing the tooth 103, permitting the oscillatable member 100 to turn in the direction shown by the arrow in Fig. 17, so that tooth 108 will strike arm 99 and release the latch 97—98 so that the master member may turn in a counter-clockwise direction about its pivot 56. When this occurs, the pin 65 carried by the master member, which is the striking surface of the master member, will move the arm 43 in the manner above described to produce the time of exposure indicated by the pointer 26 and the graduation 27 in Fig. 1.

When any but the highest speed exposure is to be made, the blade ring 34 swings in a clockwise direction under the impulse of the striking surface 65 against the contact surface 45 of the blade ring arm 43. This movement swings the flat surface 52 of pin 251 into contact with the blade ring holding latch 53 which latch is in the Fig. 13 position. Thus, movement of the blades is temporarily or momentarily arrested while the pin or striking surface 65 swings across the connecting surfaces 47 and 46 of the blade ring arm 43 and just before movement of the arm 43 is resumed by the striking surface 65 striking the contact surface 44, the flange 63 will strike the end 110 of the latch 53 as indicated in Fig. 13, moving this latch out of engagement with the pin 251 so that when the striking surface 65 engages the contact surface 44 the blades are free to move to their fully-closed position. The blades will be held in their fully-closed position because the striking surface 65 remains in contact with the master member arm 43. The blades therefore will be held against movement after an exposure.

In order to hold the blades against movement before exposure, the latch shown in Fig. 3 is used. This latch is spring-held in the operative position shown in Figs. 2 and 3 and, as indicated in Fig. 2, engages the point 51 on the blade ring 34 when the shutter is in its set position. Consequently, a jar will not tend to open the set shutter blades. Fig. 7 shows the spring 112 which positions a latch 48 and also indicates how this latch is released. When the arcuate plate 74 is moved by the handle 75 from its rest position "R" towards its tripped position "T," the lever moves in a counter-clockwise direction and a shoulder 113 on this latch will engage the upstanding lug 114 turning member 48 in a counter-clockwise direction, thereby releasing the latch element 50 from the latch element 51. The relative positions of the shoulder 113 and the lug 114 are such that the blade rings are released before the striking surface 65 can move the necessary distance to move the blade ring arm 43.

The present embodiment of my shutter does not include "time" exposure, that is, an exposure which is made by opening the shutter blades by depressing the trigger once and then by closing the shutter blades by depressing the trigger a second time. It does, however, include a means for producing a manually-controlled and prolonged exposure of the usual "bulb" type—that is, an exposure in which the trigger is depressed to open the shutter blades and in which the trigger is released to close them. To obtain this bulb exposure, use is made of the blade ring latch 53 best shown in Figs. 13 to 15 inclusive. This latch 53 is normally held by the spring 255 against a stop pin 116. The latch includes an upstanding lug 117 which is so positioned that it may be engaged by a hook 118 on the bulb lever 119 which is pivoted on the stud 58, also carrying the master member pivoted lever 57. A spring 120 tends to turn the bulb lever in the direction shown by the arrow in Fig. 14. This movement can only be accomplished when the upturned lug 121 can move a limited distance in the cam slot 122 shown in Fig. 22. The rest of this cam slot is a concentric groove 123 and when in this groove, the lug 121 will hold the bulb lever in its inoperative position shown in Fig. 14. However, as the speed cam control ring is turned until the pointer 26 lies opposite the graduation "B," the lug 121 is brought into the widened cam area 122 so that the spring 120 will thrust the hook 118 behind the lug 117 of the blade ring latch. The blades will be held in their fully-opened position because the latch 53 can no longer be released by the flange 63 of the master member 43. Thus, the blades will be opened when the handle, serving as a trigger, 75 is depressed. When the handle 75 is released, the upstanding lug 87 moves away from arm 107 of the oscillatable member latch 104, so that the spring 106 can turn this latch member moving the arm 105 so that it will engage the upstanding lug 121 which also engages the cam slot 123. This will turn the bulb lever about its pivot 58 against its spring 120 causing the bulb lever 119 to be moved back from its Fig. 15 to its Fig. 14 position. As soon as the hook 118 releases the upstanding lug 117 the master member flange 63, through its engagement with the blade ring latch, releases this latch so that the master member can then close the shutter blades. The duration of a bulb exposure of course depends on the length of time that the handle 75 is depressed since the blades open when the handle 75 is moved from its "R" to its "T" position and closed when the handle moves from its "T" to its "R" position.

As above pointed out, the shutter blades 29 open and close in moving in one direction. Consequently, it is necessary to close the exposure aperture while the opening and closing movement of the blades takes place in setting the shutter. Certain features of the diaphragm leaf closing mechanism are similar to the diaphragm shutter shown in my Patent 2,362,547, granted November 14, 1944, although the particular means for operating this mechanism is quite different.

Figure 20:
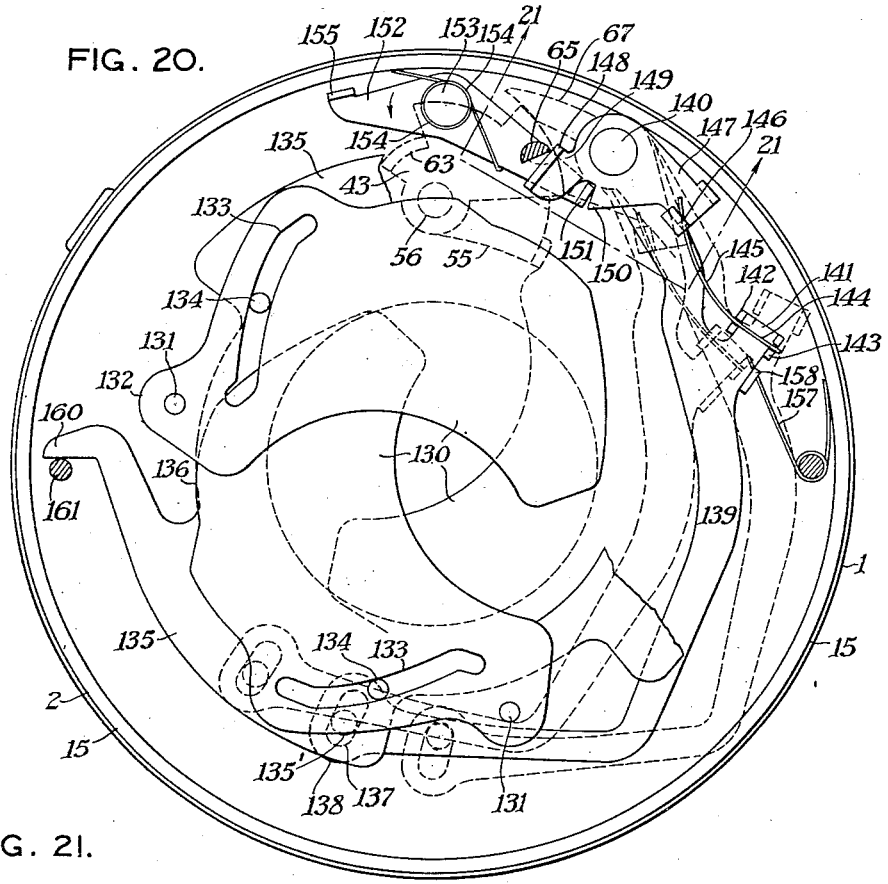
Fig. 20 is a front view with parts removed showing diaphragm leaves and operating mechanism.
Figure 21:
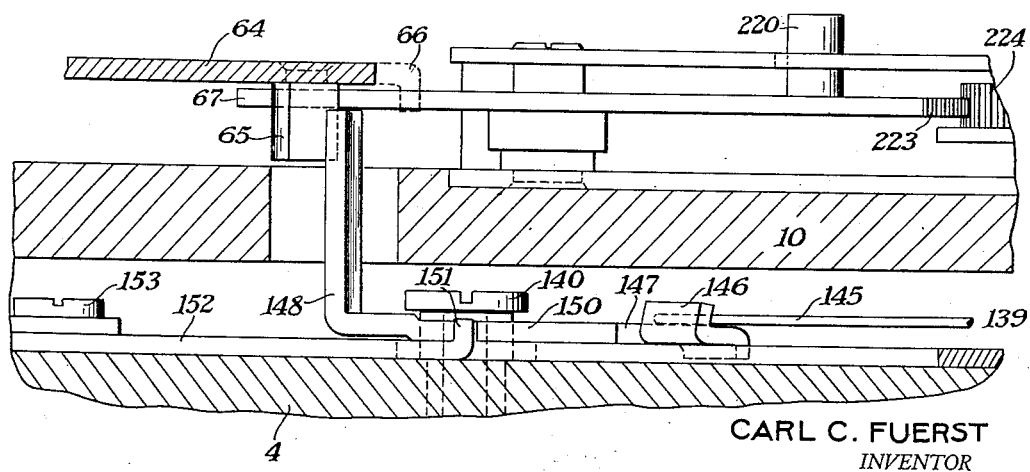
Fig. 21 is an enlarged section taken on line 21—21 of Fig. 20.

Referring to Fig. 20, in the present embodiment of my invention I provide three diaphragm leaves 130, each of these leaves being pivotally mounted on pins 131 carried by the fixed diaphragm ring 132 also shown in Fig. 8. Each diaphragm leaf is provided with a cam slot 133 which engages a pin 134 carried by an adjustable diaphragm ring 135, this ring including recessed portions 136 permitting the ring to move about the pins 131. The movable diaphragm ring 135 includes an upstanding pin 135' which is engaged by the slot 137 in the end 138 of a lever 139, this lever being pivoted on a stud 140 carried by the mechanism plate 10.

The lever 139 includes an offset arm 141 having a pair of spaced upstanding ears 142 and 143, each of which is slotted to receive and hold an end, 144, of a leaf spring 145, the opposite end of which engages an ear 146 on a pivoted lever 147, also mounted to turn on the stud 140. The lever 147 includes a flange 148 on the arm 149, this flange being positioned to be engaged by the striking surface 65 of the master member 43. This engagement only occurs when the master member is turning towards its set position and the relative position of flange 148 and the striking surface 65 is so arranged that the diaphragm leaves will be opened after the shutter blades have opened and closed during the setting movement.

The lever 147 carries a latch element 150 which may be engaged by a latch element 151 carried by the bell crank lever 152. This lever is pivoted on a stud 153 and, as shown in Fig. 14, a spring 154 tends to turn this lever in the direction shown by the arrow in Fig. 20 and into a position to latch the lever 147 in a position to hold the shutter blades in an open position. The bell crank lever 152 is provided with an upstanding ear 155, this ear lying in the path of movement of the blade ring arm 43 and particularly the cam end 156 thereof (Fig. 7). Referring to Fig. 6, when lever 43 swings to the left with respect to this figure, it will strike part 155 rocking the bell crank lever 152 in a clockwise direction so as to release the latch 150. When this is done, the diaphragm lever spring 157 (Fig. 20), through its engagement with a lug 158, will swing the lever 139 in a closing direction so that the diaphragm leaves will be completely closed shortly after the shutter blades have opened and closed to make an exposure.

The diaphragm leaf adjusting ring 135 is provided with a hook 160 which controls the total opening movement of the diaphragm leaves under the impulse of lever 147. Since there is a flexible connection or a lost motion connection between the lever 147 and the lever 139 because of the leaf spring 145, this spring will permit the diaphragm leaves to stop in any position determined by the pin 161, which pin is controlled by movement of a diaphragm operating plate 164 best shown in Fig. 8. A diaphragm finger piece 165 extends from part 164 up across the upstanding flange 2 of the shutter casing, terminating in a diaphragm pointer 166 which, as shown in Fig. 1, can be brought opposite a suitable graduation 167 of the diaphragm scale arranged around the bottom of the etched plate 23. This diaphragm blade stop is similar to that shown in my patent although the means for actuating the diaphragm lever 139 is quite different.

There are a number of advantages in providing an oscillatable member 100 which can swing upon its stud 101 under the impulse of its own spring 102 for operating the shutter. First, such an oscillatable member permits a shutter in which the trigger or release lever can be so arranged that an excessively light pressure on the trigger will release the shutter and this occurs without any tendency to shake the shutter. Second, it provides a part co-acting with the release of the shutter in such a manner that movement of the oscillatable member always bears a definite relationship to the various positions of the shutter blades. Consequently, it forms an ideal member on which a switch can be placed to make a circuit which can be used for synchronizing flash lamps. Third, it adds but little to the necessary force required for setting the shutter since the flange 89, through its engagement with a tooth 165, turns the oscillatable member as the handle 75 is moved to set the master member and the shutter blades.

If desired, my shutter may be equipped with a connecting plug 170, Fig. 4, having one terminal 171 connected to an insulated wire 172 and having a second terminal 173 connected to a wire 174 grounded to the casing. The wire 172 may be passed around the flange 2 of the shutter casing in any convenient manner but preferably in a shallow groove 175, and it may be connected to a terminal 176 (Fig. 4) forming one element of a switch. The other element 177 of the switch is carried by a bell crank lever 178. This lever, as shown in Fig. 4, carries a pivot 179 on which a latch element 180 is mounted to turn, a spring 181 normally holding a lug 182 in the position shown in Fig. 4 against the bell crank lever. The opposite end 183 of the bell crank lever carries a gear segment 184, meshing with a pinion 185, carrying a flywheel or weight 186.

Figure 25:
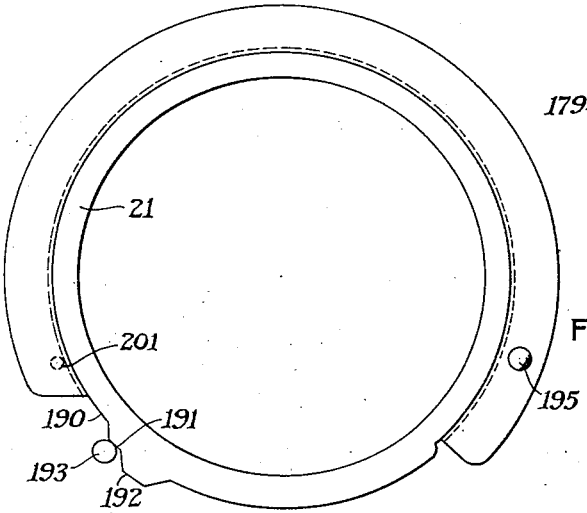
Fig. 25 is a plan view of the synchronizing cam removed from the shutter with cam follower indicated in position for 5 millisecond retard.

Each time the oscillatable member 100 turns in a clockwise direction, a tooth 187 may engage latch-arm 180 so as to turn the bell crank lever to control the speed of operation of the oscillatable member 100. The degree of engagement of this retarding member with the oscillatable member 100 may be controlled by the cam ring shown in Fig. 25. This ring 21 is provided with a step cam comprising three steps—190, 191, and 192. A pin 193 carried by the bell-crank lever 198 engages these cams and controls the time when the switch 177—176 makes contact relative to the full, open position of the blades. As indicated in Fig. 1, there is a pin 195 extending through a slot 196 in the etched plate 23. This pin may be moved opposite graduations 197 indicating the required millisecond delay for various different flash bulbs. For instance, the No. 5 flash bulb happens to require a five-millisecond delay and since the pin 195 is set at 5 in Fig. 1, the pin 193 in Fig. 25 being similarly positioned will give the required delay so that the flash lamp will reach its full brilliance while the shutter blades are fully opened.

The pin 193 is carried by the insulated section 198 which can be swung about the stud 199 on which the bell crank lever 178 is mounted. Thus, movement of the cam 21 controls the position of the insulated segment 178 and with it the contact 176 relative to the contact 177. The latch 180 carries an upstanding lug 200, this lying in the path of pin 201 on the flash-adjusting cam 21 and contacting with it when the contact ring is adjusted to the zero position shown in Fig. 1. In this position the latch 180 will be rocked against the action of its spring 181 into an inoperative position so that the switch mechanism may not be moved at all when the synchronizing cam 21 is set to the zero position.

While it is possible to obtain the extremely high speeds with the single spring 60 driving the master member, if desired, an additional spring can be brought into play for the highest speed exposure here shown as $\frac{1}{800}$ of a second. This is accomplished in the manner shown in Figs. 18 and 19. On the master member pivot 56 I provide a lever 210 which is mounted to freely turn on the pivot 56. One end of spring 211 engages lever 210 and is coiled at 212 about the post 56. The arm 210 may be engaged by one of the steps of cam 213 so that when the pointer 26 is brought opposite the 800 on the scale 27, the lever 210 will be turned to the position shown in Fig. 18, while at the same time portion 68 of the cam will hold the cam follower 69 in its raised or high-speed position. Thus, spring 212 is added to spring 60 for the highest speed exposure only by turning the speed cam ring so that the cam follower 69 swings the pivoted lever in a generally radial direction to its high-speed position. When the cam follower 69 is allowed to return to cam surface 71, spring 212 is unwound so that it is no longer operative to assist spring 60. In many cases it may be found that this additional spring is entirely unnecessary but it has been described as a useful addition to the master member described above.

The stepped cam surface 213 is positioned to engage an upstanding pin 220 carried by arm 67 pivoted on a stud 221. A spring 222 tends to turn this arm in the direction shown by the arrow in Fig. 4 so that the pin 220 resting against the stepped cam 213 limits the degree of engagement of this arm with the master member lug 66. Gear segment 223 meshes with a pinion 224 of a train of gears terminating in a starwheel 225 with which a pallet 226 may be engaged. The pallet 226 is pivoted at 227 upon a lever 228 pressed by a spring 229 into a starwheel-engaging position. However, the pin 227 extends upwardly into the cam slot 230 as indicated in Figure 22, so that the starwheel is only engaged for some of the more prolonged automatic exposures.

When setting the shutter it is necessary to move the handle 75 fully to the set position "S." The setting movement of the manually operable lever 74 causes nose 91 to engage and move the master member 64 and the lug 92 on lever 74 to move the blade rings through arm 43. Also striking surface 65 of the master member must strike flange 148 to open the diaphragm leaves 130 and latch them open by latch 150—151. Since the diaphragm leaves must be opened only after the shutter blades open and close and the timing is close, full setting is important.

A latch is therefore provided which will make it necessary to fully set the handle 75 through the last and critical part of its travel. Referring to Fig. 6 shows the extreme end 235 of the arcuate lever 74 as constituting one latch element, and the downwardly extending spring 236 the other latch element. Spring 236 has a downwardly turned flange 237 fastened on arm 238 of the oscillatable member latch lever 105 as by rivets 239. In Fig. 6 "D" shows the critical final setting movement. If not fully set and the setting lever returns before reaching this last movement, no harm is done.

When handle 75 is moved towards its set position "S," Fig. 16, the cam surface 240 swings lever 105 to the left in Fig. 16 so flange 237 lies below latch 235 and consequently any reverse movement after passing the spring latch 236 is prevented. Further movement of handle 75 swings the oscillatable member 100 so that cam 240 passes lever 105 and as soon as tooth 103 snaps past latch edge 104 the shutter, as well as the oscillatable member are all completely set and are now ready for exposure. This is a safety feature, not essential but useful.

In order to visualize the size of my present shutter constructed in accordance with a preferred embodiment of my invention, as shown in the drawings, it might be pointed out that the view in Fig. 4 is approximately four times the actual size of this shutter which will be known as a No. 1 shutter. It is probable that there will be at least one smaller size and several larger sizes, but the first shutter is being considered in the No. 1 size which has a clear exposure aperture of .765 inch. Throughout the drawings applicant has endeavored to closely follow the various parts to actual scale although in some instances, and particularly where springs are shown, it is impossible to show them of the correct thickness and still retain the type of showing required in Patent Office drawings. In many of the views, parts have been omitted in an effort to clearly show the construction of other parts. I have been able to obtain, with the above-described shutter mechanism, an exposure of $1/800$ of a second with a clear exposure aperture of .765 inch using the standard system of measuring effective exposures. It it undoubtedly possible to obtain considerably faster exposures at some sacrifice of durability because I have provided extremely high speeds utilizing only springs of the type which are now in use in standard shutters on the market without increasing the tension on these springs. This is accomplished by reducing the moving parts necessary for driving the shutter blades from the master member to a minimum. In addition, I have provided a shutter in which the release requires only a very light or delicate pressure on the trigger, thereby noticeably reducing vibration of the shutter which frequently occurs from relatively heavy trigger pressure. The master member is small and of comparatively light weight and it acts directly upon an arm carried by one of the blade rings so that additional intermediate parts heretofore rather generally used have been omitted.

The master member has a striking surface which moves through an arcuate path, this path being changed for "normal speed" and "high speed" exposures. The length of the striking surface of the master member is only approximately one-third the length of the blade ring arm measuring each from its own center of rotation. The master member striking surface 65 travels about twice as many degrees about its pivot before striking the contact surface 44 for "high speed" than it does for striking surface 45 for "normal speed" in the embodiment of my invention illustrated in the drawings. This data is by way of illustration since it is obvious that by altering the size of the parts these various ratios can be readily changed. However, I have found the above data desirable in an extremely compact shutter of the type shown in the present embodiment of my invention.

The operation of my improved shutter is extremely simple, although a description of the various movements of the parts which take place inside the shutter casing is necessarily rather long. Assuming the shutter is in its normal condition of rest after an exposure has been made, as shown for instance in Fig. 4, the handle 75, which serves both as a trigger and a setting lever, is in its position of rest "R." The operator selects the required speed by turning the narrow ring speed-adjusting cam 16 until the pointer 26 is brought opposite a graduation 27 on the shutter cover plate 23. If the diaphragm opening has not been selected, the lever 166 may be moved to the required diaphragm opening graduation 167 also on the cover plate 23. If a flash exposure is not required, the knob 195 may be moved to the graduation zero on the scale 197 on the shutter cover plate.

The operator then moves handle 75 from its rest position "R" to its set position "S." This movement accomplishes a series of different things. First, referring to Fig. 6, the nose 91 of the lever 74 strikes part 64 of the master member, turning it to its set position and winding up the driving spring 60. Second, the lug 92 on the lever 74 moves the blade ring arm 43 about its center of rotation causing the shutter blades to open and close. Third, the striking member 65 on the master member engages the lever 149 swinging it to tension spring 145, this spring in turn, as shown in Fig. 20, overcoming spring 157 of the diaphragm leaf lever 139 and causing the diaphragm leaves to open to the preselected stop as controlled by the pin 161 and the hook 160 on the diaphragm leaf-adjusting ring 135. Fourth, the movement of the lever 74, as indicated in Fig. 6, causes flange 89 to engage the oscillatable member or starwheel tooth 165 turning this member while tensioning its spring 102. As all these movements are accomplished, various latches drop into position to hold the parts in their set position.

The master member is held in its set position by means of the latching flange 97 engaging the master member flange 98. The shutter blade arm 43 is held in its position by means of the latch 50 engaging the blade ring latch 51. The oscillatable member 100 is held in its latched position by means of the end 104 of the latch 105, dropping behind the tooth 103 on the oscillatable member. All of the parts are positioned automatically, and there is an additional safety spring latch 236 adapted to momentarily hold the latch element 235 of the lever 74 against backward movement until all of the parts have been moved and latched in their set position. The shutter is now ready for an exposure and it should be noticed that as soon as the full setting stroke has been accomplished, the release of the handle 75 causes the spring 86 to return the setting lever from its "S" position to its rest or "R" position from which position the handle 75 may serve as a trigger to release the shutter. With the parts set as indicated in Fig. 14, (which shows the shutter set but which does not show the shutter handle 75 released and returned to its "R" position) the trigger may be depressed moving the handle 75 from its "R" position to its tripped position "T." This movement causes the lug 87 of lever 74 to strike arm 107 of lever 105 turning this oscillatable member latch in a clockwise direction and releasing the tooth 103 from the latch 104. The oscillatable member 100 turning under the power of its own spring will cause tooth 108 to strike the end 99 of the master member latch releasing the latch element 97 from the shoulder 98 and permitting the master member to turn. As the master member turns, since the shutter has been set for a "normal speed" exposure, the striking surface 65 will first engage the contact surface 45 swinging the blade ring 31 in a counter-clockwise direction while blade ring 34 moves in an opposite direction. The striking member will ride over faces 47 and 46 during which time the blade rings will momentarily remain stationary because of the engagement of latch 53 and pin 251. However, when the striking surface 65 engages contact surface 44 flange 63 of the master member releases the latch 53 and as the pin 65 engages the surface 44 the latch, having been just released, permits the shutter arm 43 to be again driven to close the blades. The shutter blades will be held in a closed position because of the pressure of the striking member 65 on the arm 43.

If the shutter should have been set for its "high" speed exposure, the master member would be given an additional impetus because the spring 212 carried by the lever 210 is tensioned when the speed-adjusting cam is moved. Thus, not only is the master member driven under higher spring power for the top speed exposure but, in addition, the striking surface 65 thereof travels a greater distance since it directly engages the surface 44 of the blade ring arm 43 and swings it in one continuous, smooth, uninterrupted movement to open and close the blades. During this movement the blade ring latch 53 is held out of its operative position.

If the shutter had been set for bulb exposures, the latch 53 would be held in by the bulb lever 119 through the engagement with the upstanding lug 117 on the blade ring latch, so that it would require an upward movement of the handle 75 from its "T" position to its "R" position in order for the shutter blades to close.

If a synchronized flash is to be used, the knob 195 is set to the required graduation on scale 197 and the shutter is actuated exactly as before, except that since the oscillatable member 100 has a speed definitely related to the opening and closing of the shutter leaves, the required millisecond delay can be accurately obtained.

If the flash is not to be used, the knob 195 is turned to the zero graduation so that the flash retard mechanism is then inoperative.

While I have described a preferred form of my invention, it is obvious that many variations can be made from the specific structure shown in the drawings and described in the above specification without departing from my invention as defined in the following claims.

What I claim is:

1. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing exposures of different durations including a pivoted lever movably carrying the master member, a striking surface on the master member having an arcuate path of movement, means for setting and releasing the master member, an arm carried by a blade ring having different contact surfaces thereon and positioned to co-act with the master member striking surface, and means for moving the pivoted lever to select the contact surface of the arm to be struck by the striking surface of the master member, to operate the blade rings to make an exposure.

2. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing differently-timed exposures including a pivoted lever movably carrying the master member, a striking surface on the master member movable through an arcuate path, means for setting and releasing the master member, an arm carried by a blade ring having different contact surfaces thereon spaced from the center of rotation of the blade ring and lying in the arcuate path of movement of the striking surface on the master member, and means for moving the pivoted lever in a generally radial direction to select the contact surface of the arm to be struck by the striking surface of the master member, to operate the blade rings to make an exposure.

3. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing differently-timed exposures including a pivoted lever movably carrying the master member, a striking surface on the master member movable through an arcuate path, means for setting and releasing the master member, an arm carried by a blade ring having different contact surfaces thereon spaced both radially and circumferentially relative to the center of rotation of the blade rings and also positioned to co-act with the master member striking surface, and means for moving the pivoted lever in a generally radial direction to select the contact surface of the arm to be struck by the striking surface of the master member and to determine the travel of the striking surface before striking the selected contact surface, to operate the blade rings to make an exposure.

4. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing differently-timed exposures including a pivoted lever movably carrying the master member, a striking surface on the master member movable through an arcuate path, means for setting and releasing the master member, an arm carried by a blade ring having different contact surfaces thereon arranged in a plurality of steps extending in a general direction away from the center of rotation of the master member and positioned to co-act with the master member striking surface, and means for moving the pivoted lever to carry the striking surface on the master member into a position from which it may be moved through a path to engage one of said steps to select the contact surface of the arm to be struck by the striking surface of the master member, the steps and striking surface being relatively positioned to cause said striking surface to move a different distance before striking a contact surface for each different step, to operate the blade rings to make an exposure.

5. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing differently-timed exposures including a pivoted lever movably carrying the master member, a striking surface on the master member movable through an arcuate path, means for setting and releasing the master member, an arm carried by a blade ring having different contact surfaces thereon, one positioned further away from the center of rotation of the master member than the other whereby the effective length of said arm carried by the blade ring may be varied, said blade ring arm being positioned to co-act with the striking surface of the master member, and means for moving the pivoted lever to select the contact surface of the arm to be struck by the striking surface of the master member and to vary the mechanical advantage of the master member striking surface relative to the blade ring lever, the centers of rotation of the blade ring and master member being selected to cause the striking surface of the master member to successively engage the contact surfaces on the blade ring arm when the pivoted arm is moved to one position, to operate the blade rings to make an exposure.

6. A shutter according to claim 1 in which there is a latch movable to and from a position to stop movement of the blade rings before movement of the blade rings has been completed.

7. A shutter according to claim 1 in which there is a latch movable to and from a position to stop movement of the blade rings before movement of the blade rings has been completed, said latch including a nose lying in the path of the master member when in a latching position to be released thereby before said master member completes its movement.

8. A shutter according to claim 1 in which there is a latch movable to and from a position to stop movement of the blade rings before movement of the blade rings has been completed, and means for holding said latch in an inoperative position when the master member carrying lever is in one position.

9. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, a pivoted lever movably carrying the master member, a striking surface on the master member movable through an arcuate path, an arm carried by a blade ring having different contact surfaces thereon lying in the arcuate path of movement of the striking surface of the master member, and means for moving the pivoted lever to select the contact surface of the arm to be struck by the striking surface of the master member, a latch for the master member for holding the latter set in all positions of the pivoted lever carrying the master member, and means for releasing said latch.

10. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing differently-timed exposures including a pivoted lever movably carrying the master member, a striking surface on the master member movable through an arcuate path of movement determined by the pivoted lever, an arm carried by a blade ring having different contact surfaces thereon movable through an arcuate path of movement and positioned to co-act with the striking surface on the master member, and means for moving the pivoted lever to select the contact surface of the arm to be struck by the striking surface of the master member, a latch for holding the master member in a set position, an operating lever movable in one direction for moving the master member to its set position, a releasing mechanism for the master member latch including a releasing lever in the path of movement of the operating member positioned to be operated thereby toward the end of the movement of the operating lever in a direction opposite to that of the movement of the operating lever is setting the shutter.

11. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing differently-timed exposures including a pivoted lever movably carrying the master member, a striking surface on the master member movable through an arcuate path determined by the pivoted lever, an arm carried by a blade ring having different contact surfaces thereon and moving through an arcuate path intersecting the arcuate path of movement of the striking surface of the master member as determined by the pivoted lever, and means for moving the pivoted lever to select the contact surface of the arm to be struck by the striking surface of the master member, a latch for holding the master member in a set position, an operating lever movable in one direction for moving the master member to its set position, a releasing mechanism for the master member latch including a releasing lever in the path of movement of the operating member positioned to be operated thereby toward the end of the movement of the operating lever in a direction opposite to that of the movement of the operating lever in setting the shutter, said releasing mechanism including an oscillatable releasing disk, a spring for driving said disk in one direction, and means carried by the operating handle for setting the releasing disk.

12. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, a pivoted lever movably carrying the master member, a striking surface on the master member, an arm carried by a blade ring having different contact surfaces thereon, and means for moving the pivoted lever to select the contact surface of the arm to be struck by the striking surface of the master member, a latch for holding the master member in a set position, an operating lever including an operating handle movable in one direction for moving the master member to its set position, a releasing mechanism for the master member latch including a releasing lever in the path of movement of the operating member positioned to be operated thereby toward the end of the movement of the operating lever in a direction opposite to that of the movement of the operating lever in setting the shutter, said releasing mechanism including an oscillatable releasing disk, a spring for driving said disk in one direction, and means carried by the operating handle for setting the releasing disk, the operating handle being adapted to engage and set both the master member and releasing disk in moving in one direction, and spring means normally positioning the operating handle in a position between the releasing and setting positions.

13. In a camera shutter of the type including an apertured casing, two interconnected blade rings movably mounted in the casing, shutter leaves operatively connected to the blade rings for movement to make an exposure through the shutter casing aperture, the combination with said blade rings, of a master member, means for producing variably timed exposures including a striking pin carried thereby movable through an arcuate path, a pivotal mount for the master member about which the striking member may turn, an arm carried by a blade ring adjacent the master member movable through an arcuate path and positioned to co-act with the striking pin moving through its arcuate path, the length of the arm from the center of rotation of the blade ring being approximately three times as great as the distance of the striking pin of the master member from the center of rotation of the master member, said master member being so situated that said striker pin may strike and drive the said blade ring arm contacting with substantially the end of said arm, and means for altering the position of striking contact with said arm comprising a movable support, said pivotal mount for the master member being carried by the support, and means for setting and releasing the master member.

14. In a camera of the type including an apertured casing two interconnected blade rings movably mounted in the casing, pivoted shutter leaves operatively connected to the blade rings for movement to make an exposure through the shutter casing aperture, the combination with said blade rings, of a master member, means for producing exposures of different durations including a pivoted lever pivotally carrying the master member, a striking pin carried by the master member swingable through an arcuate path of movement about the master member pivot, means for setting and releasing the master member, an arm carried by a blade ring extending into the path of movement of the striking pin and positioned to co-act therewith, movement of said pivoted lever carrying the pivoted master member changing the angular travel of the striking pin before striking said blade ring arm to move said arm for operating the shutter blades at different speeds.

15. In a camera of the type including an apertured casing two interconnected blade rings movably mounted in the casing, pivoted shutter leaves operatively connected to the blade rings for movement to make an exposure through the shutter casing aperture, the combination with said blade rings, of a master member, means for producing exposures of different durations including a pivoted lever pivotally carrying the master member, a striking pin carried by the master member swingable through an arcuate path of movement about the master member pivot, means for setting and releasing the master member, an arm carried by a blade ring extending into the path of movement of the striking pin and positioned to co-act therewith, means for moving the pivoted lever to move the pivoted master member to different positions in a general radial direction with respect to the center of rotation of the blade ring arm, whereby the striking pin carried by the master member may operate said blade ring arm with different mechanical advantage at different positions of said pivoted lever.

16. The camera shutter defined in claim 14 characterized by a striking pin and blade ring arm being positioned to vary the angular travel of the striking pin before engaging and driving the blade ring arm from approximately six degrees at one extreme position to approximately eighteen degrees at the opposite extreme position.

17. The shutter defined in claim 14 characterized by the arm carried by a blade ring extending in a generally radial direction and having two angularly offset generally radial striking surfaces, and the striking pin carried by the master member being movable on the pivoted arm in a generally radial direction along said arm to strike either of said two striking surfaces for producing differently timed exposures.

18. The shutter defined in claim 14 characterized by the arm carried by a blade ring extending in a generally radial direction and having two angularly offset generally radial striking surfaces, and the striking pin carried by the master member being movable on the pivoted arm in a generally radial direction, the angular offset of the two generally radial blade ring arm surfaces relative to the positions of the striking pin altering the angular travel of the latter about its pivot before striking said blade ring arm for making differently timed exposures.

19. The shutter defined in claim 14 characterized by the arm carried by a blade ring extending in a generally radial direction and having two angularly offset generally radial striking surfaces, and the striking pin carried by the master member being movable on the pivoted arm in a generally radial direction, the angular offset of the two generally radial blade ring arm surfaces relative to the positions of the striking pin altering the angular travel of the latter about its pivot before striking said blade ring arm so that said striking pin may travel approximately three times the angular distance before striking said blade ring arm in making one exposure over that traveled for making the other exposure.

20. The shutter defined in claim 14 characterized by the arm carried by a blade ring extending in a generally radial direction and having two angularly offset generally radial striking surfaces, and the striking pin carried by the master member being movable on the pivoted arm in a generally radial direction along said arm to strike either of said two striking surfaces for producing differently timed exposures, and means, associated with one of said two striking surfaces for retarding movement of the master member before said master member completes its movement.

21. In a camera of the type including an apertured casing two interconnected blade rings movably mounted in the casing, pivoted shutter leaves operatively connected to the blade rings for movement to make an exposure through the shutter casing aperture, the combination with said blade rings, of a master member, means for producing exposures of different durations including a pivoted lever pivotally carrying the master member and movable between two positions selected to move the master member substantially radially of the center of rotation of the blade rings, a striking pin carried by the master member and having two adjacent arcuate paths of movement according to the position of the pivoted lever, an arm extending in a generally radial direction from a blade ring, said striking pin, when in one position, coacting with one portion of said blade ring arm for moving said arm and when in the other position coacting with another portion of said blade ring arm radially spaced from said first mentioned portion of said arm whereby said striking pin may operate said blade ring arm at two different mechanical advantages.

22. In a camera shutter of the type including an apertured casing, pivotally mounted shutter blades mounted for movement to open and close the aperture to make an exposure, mechanism for moving the shutter blades, the combination with said shutter blades, of a master member for operating said mechanism to move the shutter blades, a latch element carried by the master member, a latch carried by the casing and engageable with the latch element on the master member for holding said master member in a set position, an oscillatable shutter releasing member, a spring moving said releasing member in a releasing direction, a lug carried thereby to engage and release the latch carried by the casing and holding the master member against movement, a shutter trigger, a second latch for holding the oscillatable shutter releasing member in a tensioned position, said second latch lying in the path of and being operable by said shutter trigger whereby operation of said trigger may release the oscillatable shutter releasing member for movement under its own spring to turn and release the master member holding latch.

23. In a camera shutter of the type including an apertured casing, pivotally mounted shutter blades mounted for movement to open and close the aperture to make an exposure, mechanism for moving the shutter blades, the combination with said shutter blades, of a master member for operating said mechanism to move the shutter blades, a latch element carried by the master member, a latch carried by the casing and engageable with the latch element on the master member for holding said master member in a set position, an oscillatable shutter releasing member, a spring moving said releasing member in a releasing direction, a lug carried thereby to engage and release the latch carried by the casing and holding the master member against movement, a shutter trigger, a second latch for holding the oscillatable shutter releasing member in a tensioned position, said second latch lying in the path of and being operable by said shutter trigger whereby operation of said trigger may release the oscillatable shutter releasing member for movement under its own spring to turn and release the master member holding latch, the lug on the oscillatable member being positioned relative to the latch engaging the master member so as to travel a predetermined distance before releasing said master member holding latch.

24. In a camera shutter of the type including an apertured casing, pivotally mounted shutter blades mounted for movement to open and close the aperture to make an exposure, mechanism for moving the shutter blades, the combination with said shutter blades, of a master member for operating said mechanism to move the shutter blades, a latch element carried by the master member, a latch carried by the casing and engageable with the latch element on the master member for holding said master member in a set position, an oscillatable shutter releasing member, a spring moving said releasing member in a releasing direction, a lug carried thereby to engage and release the latch carried by the casing and holding the master member against movement, a shutter trigger, a second latch for holding the oscillatable shutter releasing member in a tensioned position, said second latch lying in the path of and being operable by said shutter trigger whereby operation of said trigger may release the oscillatable shutter releasing member for movement under its own spring to turn and release the master member holding latch, the lug on the oscillatable member being positioned relative to the latch engaging the master member so as to travel a predetermined distance before releasing said master member holding latch, and means for varying the speed of movement of the oscillatable shutter releasing member.

25. In a camera shutter of the type including an apertured casing, pivotally mounted shutter blades mounted for movement to open and close the aperture to make an exposure, mechanism for moving the shutter blades, the combination with said shutter blades, of a master member for operating said mechanism to move the shutter blades, a latch element carried by the master member, a latch carried by the casing and engageable with the latch element on the master member for holding said master member in a set position, an oscillatable shutter releasing member, a spring moving said releasing member in a releasing direction, a lug carried thereby to engage and release the latch carried by the casing and holding the master member against movement, a shutter trigger, a second latch for holding the oscillatable shutter releasing member in a tensioned position, said second latch lying in the path of and being operable by said shutter trigger whereby operation of said trigger may release the oscillatable shutter releasing member for movement under its own spring to turn and release the master member holding latch, the lug on the oscillatable member being positioned relative to the latch engaging the master member so as to travel a predetermined distance before releasing said master member holding latch, a gear train, means for delaying movement of the oscillatable shutter releasing member after its release by the shutter trigger, including a tooth carried by the oscillatable member engaging said gear train.

26. In a camera shutter of the type including an apertured casing, pivotally mounted shutter blades mounted for movement to open and close the aperture to make an exposure, mechanism for moving the shutter blades, the combination with said shutter blades, of a master member for operating said mechanism to move the shutter blades, a latch element carried by the master member, a latch carried by the casing and engageable with the latch element on the master member for holding said master member in a set position, an oscillatable shutter releasing member, a spring moving said releasing member in a releasing direction, a lug carried thereby to engage and release latch carried by the casing and holding the master member against movement, a shutter trigger, a second latch for holding the oscillatable shutter releasing member in a tensioned position, said second latch lying in the path of and being operable by said shutter trigger whereby operation of said trigger may release the oscillatable shutter releasing member for movement under its own spring to turn and release the master member holding latch, the shutter trigger being movably mounted on the shutter casing, for movement to and from a releasing position, a lug carried by the trigger and engageable with the spring operated shutter releasing member to move this member against its spring and to a position in which it may be held in a set position by said second latch when said shutter trigger is moved from a releasing direction.

27. In a camera shutter of the type including an apertured casing, pivotally mounted shutter blades mounted for movement to open and close the aperture to make an exposure, mechanism for moving the shutter blades, the combination with said shutter blades, of a master member for operating said mechanism to move the shutter blades, a latch element carried by the master member, a latch carried by the casing and engageable with the latch element on the master member for holding said master member in a set position, an oscillatable shutter releasing member, a spring moving said releasing member in a releasing direction, a lug carried thereby to engage and release the latch carried by the casing and holding the master member against movement, a shutter trigger, a second latch for holding the oscillatable shutter releasing member in a tensioned position, said second latch lying in the path of and being operable by said shutter trigger whereby operation of said trigger may release the oscillatable shutter releasing member for movement under its own spring to turn and release the master member holding latch, the shutter trigger being movably mounted on the shutter casing for movement to and from a releasing position, a lug carried by the trigger and engageable with the spring-operated shutter releasing member to move this member against its spring and to a position in which it may be held in a set position by said second latch when said shutter trigger is moved to set said shutter, and spring means tending to hold the trigger in an intermediate position between the ends of its movement in both directions.

28. In a camera shutter of the type including an apertured casing, two interconnected blade rings mounted in the casing, shutter leaves operatively connected to the blade rings to make an exposure through the shutter casing aperture, the combination with said blade rings, of mechanism for driving said blade rings including an arm extending in a generally radial direction from a blade ring and movable through a fixed arcuate path, a striking surface on the arm including a pair of angularly and radially spaced faces connected by a generally concentric face, a pivoted lever, a master member pivotally carried thereby, and including a striking pin movable through an arcuate path crossing the arcuate path of said blade ring arm, means for setting and releasing the master member, said pivoted lever having different positions for positioning the master member striking pin in different operative positions to co-act with the blade ring arm, in one position of said arm positioning the master member striking pin for engaging one of said angularly and radially spaced faces, and in another position of said arm positioning the master member striking pin for engaging one angularly and radially spaced faces after the other, moving between said faces across the generally concentric face.

29. In a camera shutter of the type including an apertured casing, two interconnected blade rings mounted in the casing, shutter leaves operatively connected to the blade rings to make an exposure through the shutter casing aperture, the combination with said blade rings, of mechanism for driving said blade rings including an arm extending in a generally radial direction from a blade ring and movable through a fixed arcuate path, a striking surface on the arm including a pair of angularly and radially spaced faces connected by a generally concentric face, a pivoted lever, a master member pivotally carried thereby, and including a striking pin movable through an arcuate path crossing the arcuate path of said blade ring arm, means for setting and releasing the master member, said pivoted lever having two positions for positioning the master member striking pin in two operative positions to co-act with the blade ring arm, in one position of said arm positioning the master member striking pin for engaging one of said angularly and radially spaced faces, and in another position of said arm positioning the master member striking pin for engaging one angularly and radially spaced faces after the other, moving between said faces across the generally concentric face.

30. A shutter as defined in claim 29 characterized by the pivoted lever positioning the master member striking pin to clear one angularly and radially spaced face and the generally concentric face in moving through the arcuate path and into striking engagement with one angularly and radially spaced face for high speed exposures.

31. A shutter as defined in claim 29 characterized by a gear delaying mechanism including a gear operating arm positioned to engage and retard the master member striking pin when said pin is moving between said angularly and radially spaced faces and across said generally concentric face.

32. A shutter as defined in claim 29 characterized by a gear delaying mechanism including a gear operating arm positioned to engage and retard the master member striking pin when said pin is moving between said angularly and radially spaced faces and across said generally concentric face, and means for varying the position of said gear operating arm relative to the arcuate path of said striking pin moving across said generally concentric face.

33. A shutter as defined in claim 29 characterized by a gear delaying mechanism including a gear operating arm positioned to engage and retard the master member striking pin when said pin is moving between said angularly and radially spaced faces and across said generally concentric face, and manually operable means to position said gear operating arm for engagement by said striking pin during all or a part of the movement of said striking pin across said generally concentric face of said blade ring arm.

34. In a camera shutter of the type including an apertured casing, two interconnected blade rings mounted in the casing, shutter leaves operatively connected to the blade rings to make an exposure through the shutter casing aperture, the combination with said blade rings, of mechanism for driving said blade rings including an arm extending in a generally radial direction from a blade ring and movable through a fixed arcuate path, a striking surface on the arm including a pair of angularly and radially spaced faces connected by a generally concentric face, a pivoted lever, a master member pivotally carried thereby, and including a striking pin movable through an arcuate path crossing the arcuate path of said blade ring arm, means for setting and releasing the master member, said pivoted lever having different positions for positioning the master member striking pin in different operative positions to co-act with the blade ring arm, in one position of said arm positioning the master member striking pin for engaging one of said angularly and radially spaced faces, said master member including a spring, means for tensioning and releasing the master member, a second master member spring, a manually adjustable member for selecting exposures, and means carried by said member for moving the pivoted lever carrying the master member and its striking pin to a high speed position in which said striking pin is positioned to engage only one of said angularly and radially spaced faces, said manually adjustable member also tensioning the second master member setting spring.

35. A shutter as defined in claim 34 characterized by the second master member spring being anchored on a lever pivoted coaxially with the master member.

36. A shutter as defined in claim 34 characterized by the second master member spring being anchored on a lever pivoted coaxially with the master member and on the pivoted lever carrying the master member, whereby said manually adjustable member may move both the master member and wind the second master member spring simultaneously.

37. In a camera shutter of the type including an apertured casing, pivotally mounted shutter blades mounted for movement to open and close the aperture to make an exposure, mechanism for moving the shutter blades, the combination with said shutter blades, of a master member for operating said mechanism to move the blades, a latch element carried by the master member, a latch carried by the casing for engaging and releasing the master member latch, an oscillatable shutter releasing member including an ear a spring for moving the oscillatable member in a releasing direction and causing said ear to release the master member latch, a second pivoted latch element carried by the casing and engageable with a latch element on the oscillatable member to hold it in and release it from a tensioned position, said second latch including a cam arm, a shutter lever engaging said cam arm and adapted to be manually actuated in one direction to move said arm and release the oscillatable member, said shutter lever being movable in an opposite direction to set said mechanism for an exposure, a spring latch on said second latch and movable therewith to and from a shutter lever engaging position, an arm on the shutter lever for setting the oscillatable lever, means carried by the shutter lever for engaging the spring latch towards the end of its setting movement preventing movement in a reverse direction until said setting lever is fully moved to set the mechanism, and means carried by the oscillatable member for releasing the spring latch.

38. The camera shutter as defined in claim 37 characterized by said oscillatable member including a tooth for moving the spring latch out of engagement with the shutter lever when the oscillatable member reaches a set position.

39. The camera shutter as defined in claim 37 characterized by a shutter lever for simultaneously setting both the master member and the oscillatable lever, said spring latch preventing the operation of the shutter unless both the master member and the oscillatable lever are fully set.

40. In a camera of the type including an apertured casing, two interconnected blade rings movably mounted in the casing, shutter blades operatively connected to the blade rings for movement to make an exposure through the shutter casing aperture, the combination with said blade rings, of a master member, means for setting and releasing the master member, said means including an operating lever, an oscillatable member, a latch normally engaging the oscillatable member and lying in the path of movement of the operating lever, a spring latch on said latch normally engaging the oscillatable member movable into and out of an operating lever engaging position, means included in the operating lever moving towards a setting position to engage said spring latch towards the end of its setting movement for holding the operating lever against movement in a releasing direction until the shutter is fully set, and means carried by the oscillatable member for releasing said spring latch when the shutter is fully set, said operating lever including an arm for setting the oscillatable member when said operating member is moved to set the master member.

41. A shutter as defined in claim 40 characterized by the latch normally engaging the oscillatable member being spring operated into engagement therewith, and the spring latch carried thereby including a downwardly projecting flange adapted to be moved transversely of an upwardly extending flange on the operating lever when said oscillatable lever is moved by the operating lever.

42. In a camera of the type including an apertured casing, two interconnected blade rings movably mounted in the casing, an arm on one blade ring, shutter blades operatively connected to the blade rings for movement to make an exposure through the shutter aperture, the combination with said blade rings and arm, of a master member positioned to move through an arcuate path to strike and drive said arm, a pivotal support for the master member, a lever carrying the pivotal support and pivoted to the shutter casing for movement between "high" and "normal" speed exposure positions, means for moving said pivoted lever comprising a manually adjustable member, a latch element on a blade ring, a latch for engaging the latch element on the blade ring, and a lug carried by the pivoted lever carrying the pivoted master member for engaging said blade ring latch for holding said latch in an inoperative position when said pivoted lever is swung to a "high" speed position.

43. A shutter as defined in claim 42 characterized by said blade ring latch lying in the path of the master member when the latter is in a "normal" speed position to be released thereby as the master member approaches the end of its arcuate path of movement.

44. In a camera of the type including an apertured casing, two interconnected blade rings movably mounted in the casing, an arm on one blade ring, shutter blades operatively connected to the blade rings for movement to make an exposure through the shutter aperture, the combination with said blade rings and arm, of a master member positioned to move through an arcuate path to strike and drive said arm, a pivotal support for the master member, a pin carried by a blade ring, a blade ring latch pivoted to the shutter and spring pressed into a position to engage said pin when the blade ring has been moved to open the exposure aperture of the shutter, a part of said blade ring latch lying in the arcuate path of movement of the master member whereby said blade ring latch may be moved from its pin engaging position as the master member moves through its arcuate path to move the blades to a closed position through engagement with the blade ring arm.

45. A shutter as defined in claim 44 characterized by the arm on the blade ring having two radially and angularly offset contact surfaces to be successively engaged by a striking surface on the master member, a generally concentric wall connecting the two offset contact surfaces, said master member releasing the blade ring latch while the striking surface passes between the two radial and angularly offset contact surfaces and over the generally concentric wall connecting said two contact surfaces.

46. A shutter as defined in claim 42 characterized by, a striking surface on the master member, and two radially and angularly offset contact surfaces on the blade ring arm, the master member being so positioned relatively to the arm that said striking surface may successively engage one contact surface after the other and means for momentarily restraining movement of the blade ring without interrupting travel of the striking surface of the master member.

47. A shutter as defined in claim 42 characterized by a striking surface on the master member, and two radially and angularly offset contact surfaces on the blade ring arm, the master member being so positioned relatively to the arm that said striking surface may successively engage one contact surface after the other without driving contact with the arm between the two contact surfaces, the striking surface of the master member having a set position spaced from both of the contact surfaces of the blade ring arm.

48. A shutter as defined in claim 42 characterized by said manually adjustable member being movable to a "bulb" exposure position as well as movable to position the pivotal support for "high" and "normal" speeds, a "bulb" lever movably mounted to clear and engage the blade ring latch, and a cam carried by the manually adjustable member engaging the bulb lever and holding said lever from a blade ring latch engaging position except when said manually adjustable member is set for "bulb" exposures.

49. A shutter as defined in claim 42 characterized by said manually adjustable member being movable to a "bulb" exposure position as well as movable to position the pivotal support for "high" and "normal" speeds, a "bulb" lever movably mounted to clear and engage the blade ring latch, and a cam carried by the manually adjustable member engaging the bulb lever and controlling its movement, a spring normally tending to move the "bulb" lever to an operative engaging position, said cam carried by the manually adjustable member including an enlargement which, when set for a "bulb" exposure will permit said spring to operatively position said "bulb" lever.

CARL C. FUERST.

REFERENCES CITED

The following references are of record in the file of this patent:

UNITED STATES PATENTS

| Number | Name | Date |
|---|---|---|
| 2,165,401 | Mihalyi | July 11, 1939 |
| 2,245,248 | Aulenbacher et al. | June 10, 1941 |
| 2,271,340 | Jacobson | Jan. 27, 1942 |
| 2,308,725 | Steiner | Jan. 19, 1943 |
| 2,333,807 | Mihalyi | Nov. 9, 1943 |
| 2,333,820 | Riddell | Nov. 9, 1943 |
| 2,362,546 | Fuerst | Nov. 14, 1944 |
| 2,362,547 | Fuerst | Nov. 14, 1944 |